United States Patent
Hasegawa et al.

(10) Patent No.: US 9,720,615 B2
(45) Date of Patent: Aug. 1, 2017

(54) WRITING DATA TO SEQUENTIAL STORAGE MEDIUM

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/868,489

(22) Filed: Sep. 29, 2015

(65) Prior Publication Data

US 2017/0090761 A1 Mar. 30, 2017

(51) Int. Cl.
*G06F 12/00* (2006.01)
*G06F 3/06* (2006.01)

(52) U.S. Cl.
CPC ............ *G06F 3/064* (2013.01); *G06F 3/0604* (2013.01); *G06F 3/0682* (2013.01)

(58) Field of Classification Search
CPC ........... G06F 12/00; G06F 12/08; G06F 12/10
USPC .................................. 711/100, 111, 154, 200
See application file for complete search history.

(56) References Cited

U.S. PATENT DOCUMENTS

| | | | | |
|---|---|---|---|---|
| 5,455,926 A | * | 10/1995 | Keele | G06F 3/0601 711/112 |
| 6,477,628 B1 | * | 11/2002 | Bish | G06F 3/0613 711/154 |
| 7,978,427 B2 | | 7/2011 | Kobayashi et al. | |
| 8,566,517 B1 | * | 10/2013 | Sims | G06F 3/065 360/72.1 |
| 8,719,528 B2 | | 5/2014 | Kimura et al. | |
| 8,954,663 B1 | * | 2/2015 | Klein | G06F 3/0619 711/111 |
| 2005/0193235 A1 | * | 9/2005 | Sandorfi | G06F 11/1456 714/6.12 |
| 2013/0031317 A1 | * | 1/2013 | Ryu | G06F 3/0611 711/154 |

* cited by examiner

*Primary Examiner* — Tuan Thai
(74) *Attorney, Agent, or Firm* — Michael O'Keefe

(57) ABSTRACT

A computer-implemented method for writing data to a sequential storage medium, includes: writing plural data blocks sequentially to the sequential storage medium; and writing a data pattern to an area on the sequential storage medium, the area being an area to which none of the plural data blocks is written, the data pattern including plural bit patterns appearing in none of the plural data blocks, and thus representing that none of the plural data blocks is written to the area and representing specific information regarding the sequential storage medium.

12 Claims, 8 Drawing Sheets

WRITING DATA TO SEQUENTIAL STORAGE MEDIUM

BACKGROUND

The present invention relates generally to a method, system, and computer program product for writing data to a sequential storage medium, and more particularly to a method, system, and computer program product for recording bit patterns with an increased variation resulting in an increased density of information stored on the sequential storage medium.

Various recoding methods have traditionally been used in writing data to a sequential storage medium. Methods used include a linear method, a scanning method and a block layout.

SUMMARY

According to an embodiment of the present invention, there is provided a computer-implemented method for writing data to a sequential storage medium. The method includes writing a plurality of data blocks sequentially to the sequential storage medium. The method further includes writing a data pattern to an area on the sequential storage medium. The area is an area to which none of the plurality of data blocks is written. The data pattern includes a plurality of bit patterns appearing in none of the plurality of data blocks, and thus representing that none of the plurality of data blocks is written to the area and representing specific information regarding the sequential storage medium.

According to another embodiment of the present invention, there is provided an apparatus for writing data to a sequential storage medium. The apparatus includes a processor and a memory coupled to the processor. The memory includes program instructions. The program instructions are executable by the processor to cause the processor to write a plurality of data blocks sequentially to the sequential storage medium. The program instructions are executable by the processor to further cause the processor to write a data pattern to an area on the sequential storage medium. The area is an area to which none of the plurality of data blocks is written. The data pattern includes a plurality of bit patterns appearing in none of the plurality of data blocks, and thus representing that none of the plurality of data blocks is written to the area and representing specific information regarding the sequential storage medium.

According to yet another embodiment of the present invention, there is provided a computer program product for writing data to a sequential storage medium. The computer program product includes a computer readable storage medium having program instructions embodied with the computer readable storage medium. The program instructions are executable by a computer to cause the computer to write a plurality of data blocks sequentially to the sequential storage medium. The program instructions are executable by a computer to further cause the computer to write a data pattern to an area on the sequential storage medium. The area is an area to which none of the plurality of data blocks is written. The data pattern includes a plurality of bit patterns appearing in none of the plurality of data blocks, and thus representing that none of the plurality of data blocks is written to the area and representing specific information regarding the sequential storage medium.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
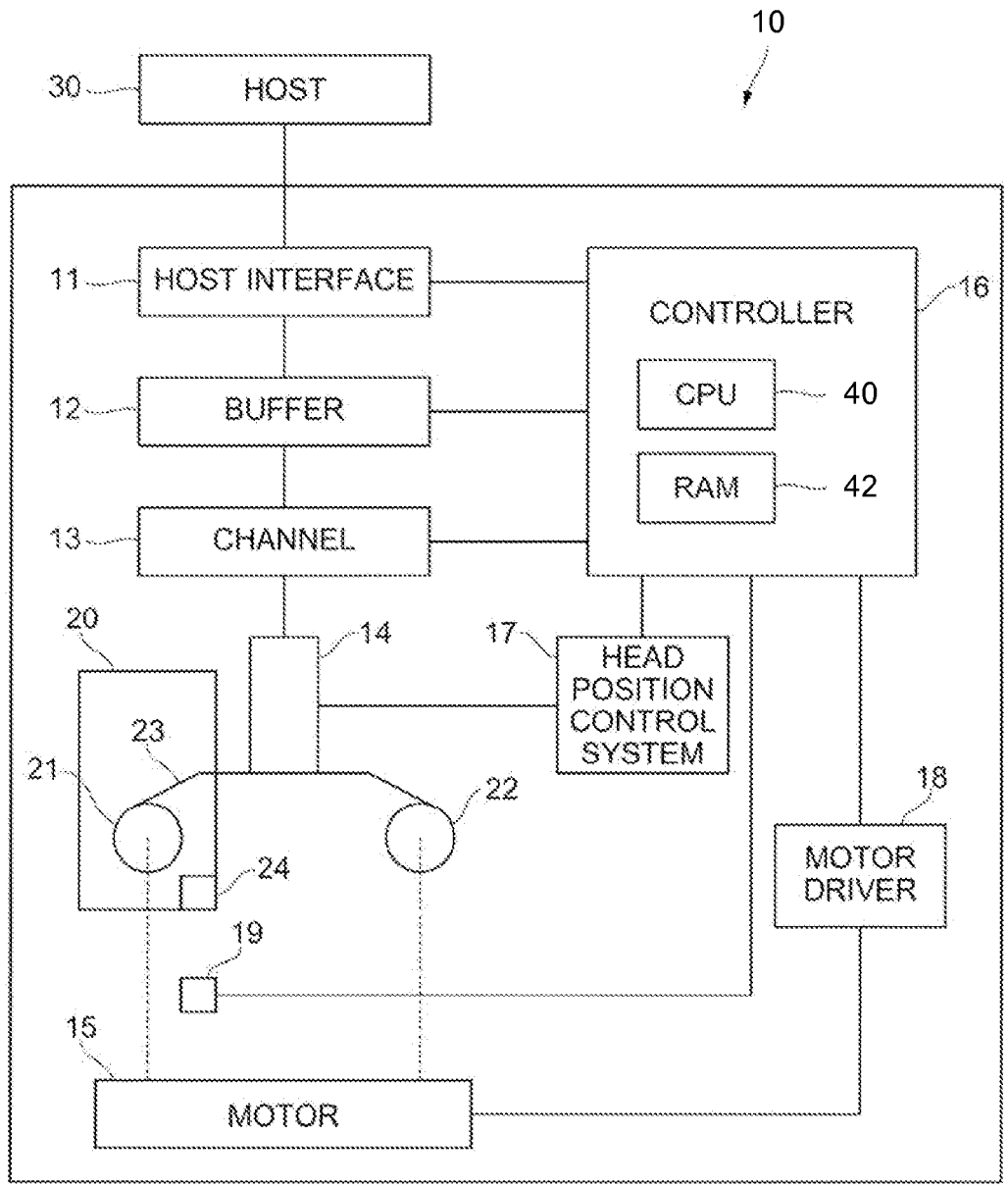
FIG. 1 depicts a block diagram of a tape drive according to exemplary embodiments of the present invention.

Referring to FIG. 1, a block diagram of a tape drive 10 to which the exemplary embodiments are applied, is shown. As shown in the figure, the tape drive 10 may include a host interface 11, a buffer 12, a channel 13, a head 14, and a motor 15. In addition, the tape drive 10 may include a controller 16, a head position control system 17, and a motor driver 18. The controller 16 may further include a central processing unit (CPU) 40, and a random access memory (RAM) 42. Furthermore, since the tape drive 10 may be configured such that a tape cartridge 20 can be inserted therein, the tape cartridge 20 is also shown in FIG. 1. The tape cartridge 20 may include a tape medium 23, as one example of a sequential storage medium, wound around reels 21 and 22. The tape medium 23 may move in a longitudinal direction thereof from the reel 21 to the reel 22, or from the reel 22 to the reel 21 along with the rotation of the reels 21 and 22. Note that, although a magnetic tape is given as an example of the tape medium 23, a tape medium other than the magnetic tape may be used.

The tape cartridge 20 also may include a cartridge memory 24. For example, the cartridge memory 24 may store information indicating how data is written in the tape medium 23. For example, a radio frequency (RF) interface may be used to examine an index of the data written to the tape medium 23, usage state of the tape medium 23, and the like in a non-contact manner, and this may allow the data to be accessed at high speed. Note that, an interface for accessing the cartridge memory 24, such as the RF interface, is shown in FIG. 1 as a cartridge memory interface 19.

The host interface 11 may perform communication with a host 30 as an example of a higher-level apparatus. For example, the host interface 11 may receive from the host 30 a command instructing the tape drive 10 to write data to the tape medium 23, a command to move the tape medium 23 to a target position, and a command instructing the tape drive 10 to read data from the tape medium 23. Note that, Small Computer System Interface (SCSI) is given as an example of a communication standard used in the host interface 11. In SCSI, the first command corresponds to a Write command, the second command corresponds to a Locate command or a Space command, and the third command corresponds to a Read command. Moreover, the host interface 11 sends the host 30 a reply indicating whether processing corresponding to these commands has been successfully performed or has failed.

The buffer 12 may be a memory for accumulating data to be written to the tape medium 23 and data read from the tape medium 23. The buffer 12 may be configured of, for example, a dynamic random access memory (DRAM). Moreover, the buffer 12 may include multiple buffer segments. Each of the buffer segments may store a data set which is a unit of writing data to and reading data from the tape medium 23.

The channel 13 may be a communication path used to send to the head 14 the data to be written to the tape medium 23 and to receive the data read from the tape medium 23 from the head 14.

The head 14 may write information to the tape medium 23 or may read information from the tape medium 23 when the tape medium 23 moves in the longitudinal direction thereof.

The motor 15 may rotate the reels 21 and 22. Note that, although the motor 15 is depicted as a single rectangle in FIG. 1, it is preferable to provide a total of two motors 15, one for each of the reels 21 and 22.

The controller 16 may control the tape drive 10. For example, the controller 16 may control writing of the data to the tape medium 23 and reading of the data from the tape medium 23 in accordance with a command received by the host interface 11. Furthermore, the controller 16 may control the head position control system 17 and the motor driver 18. In the controller 16, the CPU 40 serves as an example of a processor, and the RAM 42 may be coupled to the CPU 40 and serves as an example of a memory. The CPU 40 may perform the abovementioned control using the RAM 42.

The head position control system 17 may be a system which tracks a desired wrap. Here, a wrap is a group of multiple tracks on the tape medium 23, as described below. When the wrap requires to be switched from the current wrap to the next wrap, the head 14 also requires to be moved electrically from the current wrap to the next wrap. Such movement is controlled by the head position control system 17.

The motor driver 18 may drive the motor 15. Note that, when the number of the motors 15 provided is two as described above, the number of the motor drivers 18 provided may be also two.

The cartridge memory interface 19 may be implemented by, for example, a radio frequency (RF) reader/writer, and may write information to the cartridge memory 24 and read information from the cartridge memory 24.

Figure 2:
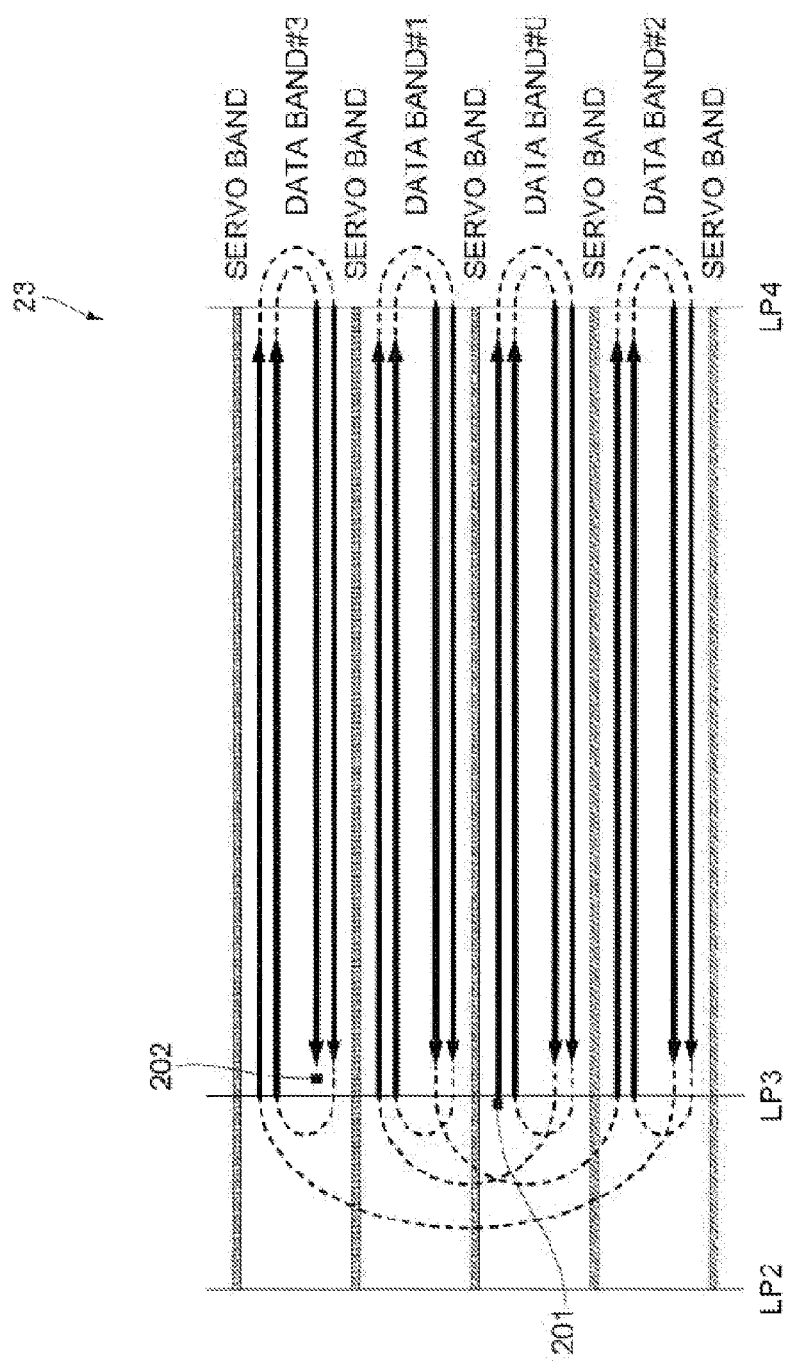
FIG. 2 depicts an example of a format of a tape medium.

Referring to FIG. 2, there is shown a diagram illustrating an example of a format of the tape medium 23. In FIG. 2, an area from the LP2 to the LP3 is a calibration area, and an area from the LP3 to the LP4 is a user data area.

As shown in FIG. 2, five servo bands may be set on the tape medium 23. Each servo band is an area where a servo pattern indicating a physical position on the tape medium 23 has been written at the time of manufacture of the tape medium 23.

Further, the tape medium 23 may be divided into four data bands by the five servo bands. Each data band is an area where user data is written. Each data band may have about ten elongated data areas each called "wrap". In FIG. 2, one solid arrow corresponds to one wrap. Data may be written to one wrap in the forward direction as indicated by the right arrow and then may be written to the next wrap in the reverse direction as indicated by the left arrow connected with the right arrow by the broken line. In FIG. 2, for ease of illustration, each of the number of the wraps where data is written in the forward direction and the number of the wraps where data is written in the reverse direction is two. However, in practice, each of the number of the wraps where data is written in the forward direction and the number of the wraps where data is written in the reverse direction may be, for example, seven to nine. Further, all the wraps in one data band may be arranged in a spiral form. In other words, data may be repeatedly written in the forward direction and the reverse direction and thus may be written back and forth on the tape medium 23 many times.

Further, on the tape medium 23 having such a format, an operation of writing data may be performed along the wraps arranged in a spiral form in a data band #0, starting from a start position 201. After that, the operation may be shifted to data bands #1, #2, and #3 in this order, and data may be written along the wraps arranged in a spiral form in each data band. This operation may continue up to an end position 202. It takes about five seconds to shift to the next data band. Thus, according to this format, in principle, only after the completion of writing data to all the wraps of a current data band, data is written to the next data band.

Note that, on the wrap where data is written in the forward direction, the beginning of the wrap (BOW) corresponds to the LP3, and the end of wrap (EOW) corresponds to the LP4. To the contrary, on the wrap where data is written in the reverse direction, the BOW corresponds to the LP4, and the EOW corresponds to the LP3.

In the meantime, when receiving records, as one example of logical data units, from the host 30, the tape drive 10 converts the records into data sets, as one example of plural data blocks, and writes the data sets to the tape medium 23. The tape drive 10 converts the records of variable length into the data sets, each of which is a unit of fixed length. The data sets to be written to the tape medium 23 may include, in addition to user data sets containing data transmitted from the host 30, a Format Identifier Data set (FID) present in the beginning of the data sets, and an End Of Data set (EOD) indicating the end of the data sets. For example, the tape drive 10 may convert the records into the data sets, using the Run Length Limited (RLL) encoding. The RLL encoding is a modulation technique for encoding data such that the number of consecutive zero bits in the encoded data is not greater than a predetermined number. Thus, by such conversion, zero and one bits become distributed evenly in each of the data sets.

In addition, the tape drive 10 writes a special data pattern to the tape medium 23 after writing the last data set and before writing the next data set. Hereinafter, this special data pattern is referred to as a Data Set Separator (DSS). The DSS which has been generally used (hereinafter referred to as a "general DSS") is composed of repetitions of a bit pattern in which the number of consecutive zero bits is greater than the predetermined number. Assuming that (1, 7) RLL encoding is used, the general DSS may be composed of repetitions of a bit pattern "100000000000", for example.

The DSS may be written in an area to which none of the data sets is written. For example, the DSS may be written between successively written user data sets, immediately posterior to the FID, immediately anterior to the EOD, immediately posterior to the EOD, immediately anterior to the BOW, immediately posterior to the BOW, immediately anterior to the EOW, immediately posterior to the EOW, or the like.

The data set stores information of several megabytes. However, the general DSS stores no information other than indicating a separation of successively written data sets, although the general DSS may occupy a longer region on the tape medium 23 than the data set depending on the circumstances.

In view of this, in the exemplary embodiments, the tape drive 10 writes the DSS composed of plural bit patterns to the tape medium 23 after writing the last data set and before writing the next data set. By utilizing the plural bit patterns in combination, the tape drive 10 embeds information in the DSS.

Specifically, the tape drive 10 may use, in addition to the bit pattern used in the general DSS, a new bit pattern in which the number of consecutive zero bits is greater than the aforementioned predetermined number. Assuming that (1, 7) RLL encoding is used, in addition to the bit pattern "100000000000", the new bit pattern "111000000000" may be used, for example. However, any bit pattern may be used, if the number of consecutive zero bits in the bit pattern is greater than the aforementioned predetermined number. In general terms, the tape drive 10 may use any bit pattern appearing in none of the data sets, and thus representing that none of the data sets is written to the area. When writing the DSS, the tape drive 10 embeds the information in the DSS by representing a "0" bit and a "1" bit with the bit pattern used in the general DSS and the new bit pattern respectively.

Some tape drives 10 write a data set having a size of approximately 5 megabytes. The longitudinal length of a data set on the tape medium 23 is approximately 100 millimeters, although it depends on the generation of the format of the tape medium 23. Assuming that the two bit patterns of 12 bits represent one bit (a "0" or "1" bit), density of data stored in the DSS is twelve times less than density of data stored in the data set. By simple arithmetic, the DSS including the two bit patterns can represent information of 400 kilobytes or greater per 100 millimeters. Note that an error correction code may be added to the information to be stored in the DSS in a similar manner to the records from the host 30, so that the information to be stored in the DSS becomes resistant to errors.

While any information may be embedded in the DSS, as a preferable embodiment, high-resolution (highly detailed) tape directory information is assumed to be embedded in the DSS, as one example of specific information regarding the sequential storage medium. Generally, the tape drive 10 has tape directory information to perform a high-speed positioning of the tape medium 23. The tape directory information indicates correspondence between physical longitudinal positions on the tape medium 23 and records written to the physical longitudinal positions. Here, the physical longitudinal positions are one example of physical positions. If the tape drive 10 is a Linear Tape-Open (LTO) tape drive, it stores, in the cartridge memory 24, the tape directory information such as a record number of a record written in the beginning of each wrap, and a record number of a record written in the middle of each wrap. The tape drive 10 determines from which part of which wrap a particular record is to be read, on the basis of the tape directory information. However, the cartridge memory 24 has a capacity insufficient to store more tape directory information. In view of this, in the preferable embodiment, the tape drive 10 embeds high-resolution tape directory information in the DSS. For example, the tape drive 10 may embed record numbers of records written at intervals of 5 meters among records already written in the last wrap (the immediately preceding wrap), in the DSS near the LP3 on the current wrap. The high-resolution tape directory information may enable the tape drive 10 to perform positioning of the tape medium 23 at a high speed in comparison with the case of using the tape directory information stored in the cartridge memory 24.

Figure 3:
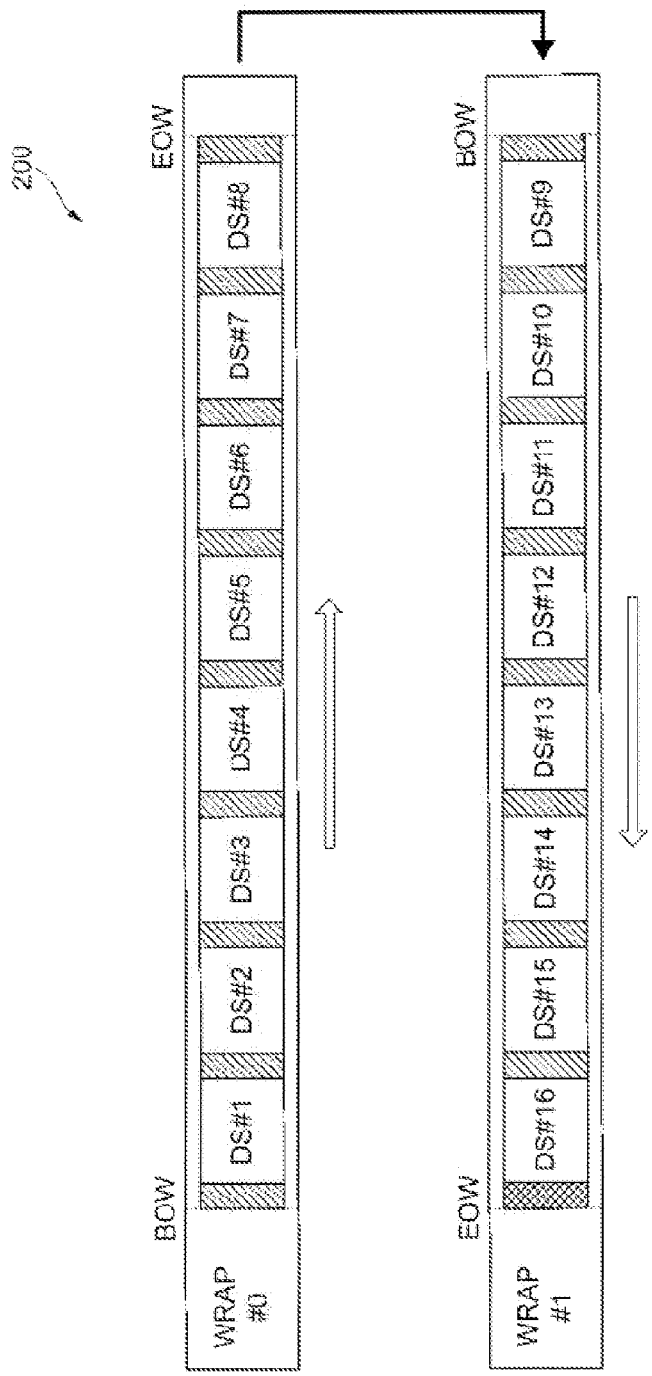
FIG. 3 depicts an example of a tape medium on which high-resolution tape directory information is embedded in a Data Set Separator (DSS).

Referring to FIG. 3, there is shown a diagram illustrating an example of a tape medium 200 on which the high-resolution tape directory information is embedded in the DSS near the LP3. In FIG. 3, each unshaded arrow indicates a direction in which data sets are written on the tape medium 200, while a black arrow indicates that a moving direction of the tape medium 200 is reversed in accordance with a wrap turn.

First, data sets DS#1 to DS#8 are written on a wrap #0 in a forward direction, as indicated by unshaded squares. While the data sets are written, DSSs are written anterior to DS#1, between DS#N and DS#N+1 where N is 1 to 7, and posterior to DS#8, on the wrap #0. In FIG. 3, all of the DSSs on the wrap #0 indicate only separation of successively written data sets, as indicated by single hatching. This is because the tape medium 200 has no wrap to which data sets can be written prior to writing the data sets to the wrap #0.

Next, data sets DS#9 to DS#16 are written on a wrap #1 in a reverse direction, as indicated by unshaded squares. While the data sets are written, DSSs are written anterior to DS#9, between DS#N and DS#N+1 where N is 9 to 15, and posterior to DS#16, on the wrap #1. In FIG. 3, a DSS posterior to DS#16 indicates the high-resolution tape directory information of the wrap #0, as indicated by double hatching, while other DSSs indicate only separation of successively written data sets, as indicated by single hatching. The area immediately posterior to DS#16 is one example of an area accessible prior to accessing any of the plural data blocks, after the sequential storage medium has been threaded.

Further, the closest DSS to the BOW on the wrap #2 indicates the high-resolution tape directory information of the wrap #1, although it is not shown in the figure. Similarly, the closest DSS to the EOW on each odd-numbered wrap indicates the high-resolution tape directory information of the last wrap, and the closest DSS to the BOW on each even-numbered wrap indicates the high-resolution tape directory information of the last wrap.

Figure 4:
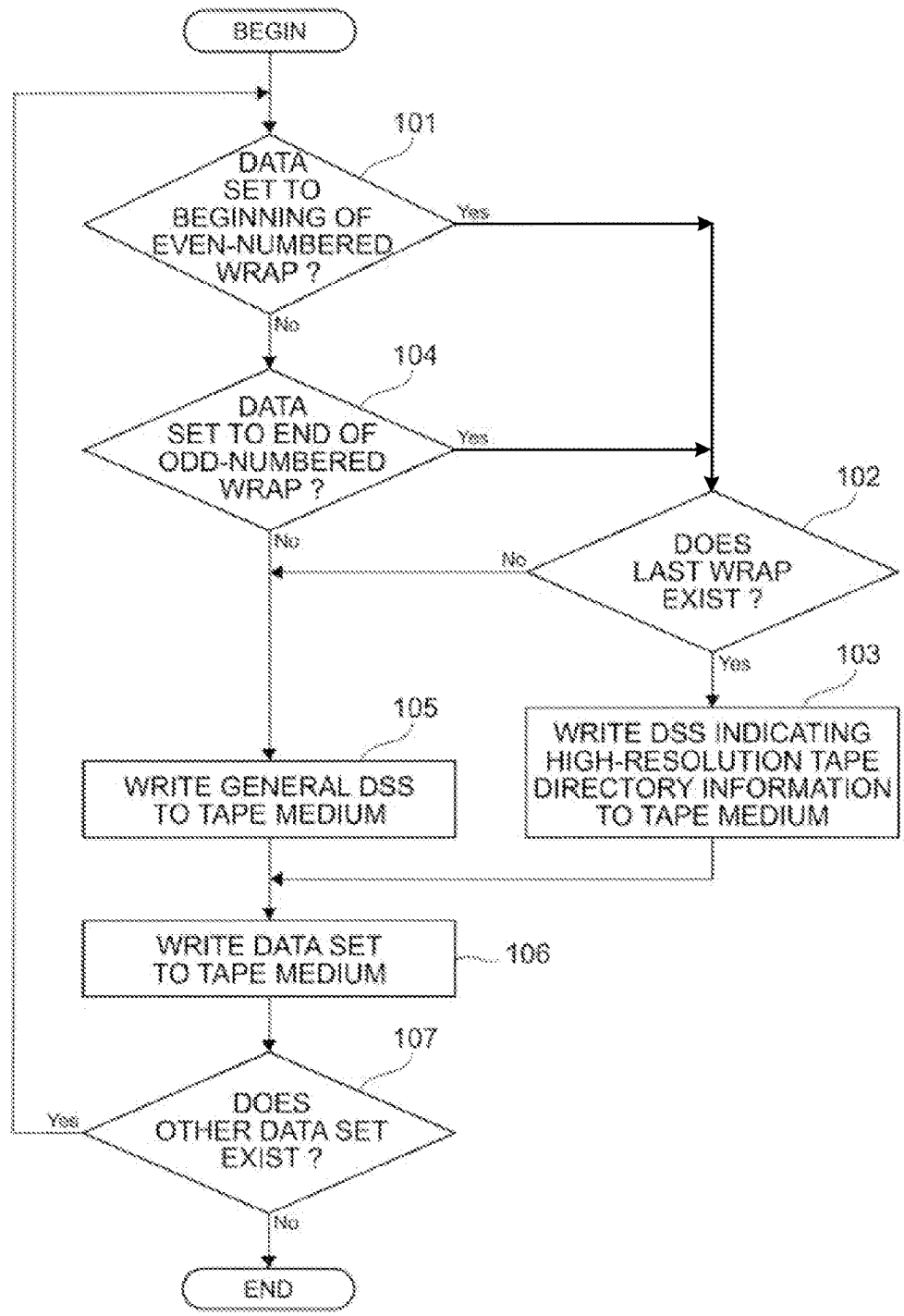
FIG. 4 depicts a flowchart representing an operation performed when a tape drive writes a DSS in which high-resolution tape directory information is embedded.

Referring to FIG. 4, there is shown a flowchart representing an example of an operation performed when the tape drive 10 writes the DSS in which high-resolution tape directory information is embedded. The host interface 11 receives records from the host 30, and stores the records in the buffer 12. After that, when receiving a write request of a data set from the host 30 via the host interface 11, the controller 16 begins the operation. Note that the controller 16 converts the records into the data set, for example, using the RLL encoding, in advance of writing the data set.

Furthermore, in FIG. 3, the high-resolution tape directory information of the last wrap is assumed to be embedded in the closest DSS to the LP3 on the current wrap (BOW on the even-numbered wrap, EOW on the odd-numbered wrap). However, in FIG. 4, the high-resolution tape directory information of the last wrap is assumed to be embedded in the DSS anterior to the closest data set to the LP3 on the current wrap.

As shown in the figure, the controller 16 may first determine whether or not the data set is to be written to the beginning of any one of even-numbered wraps on the tape medium 23 (step 101). If the data set is to be written to the beginning of an even-numbered wrap, the controller 16 may further determine whether or not the last wrap exists (step 102). This is because the controller 16 can obtain the high-resolution tape directory information after completing writing of data sets on the last wrap. If the last wrap exists, the controller 16 may write a DSS indicating the high-resolution tape directory information to the even-numbered wrap on the tape medium 23 (step 103). Specifically, the controller 16 may first generate the high-resolution tape directory information on the basis of the distribution of data sets which have been written to the last wrap, and may determine plural bit patterns to be embedded in the DSS on the basis of the high-resolution tape directory information. Next, the controller 16 may control the motor driver 18 to drive the motor 15, the head position control system 17 to adjust the position of the head 14 to the even-numbered wrap, and the channel 13 to supply the DSS composed of the plural bit patterns to the head 14.

If, at step 101, the data set is not to be written to the beginning of any one of the even-numbered wraps, the controller 16 may determine whether or not the data set is to be written to the end of any one of odd-numbered wraps on the tape medium 23 (step 104). If the data set is to be written to the end of an odd-numbered wrap, the controller 16 may proceed to step 102, and perform a processing in the similar manner to the case where the determination result of step 101 is "YES".

If, at step 104, the data set is not to be written to the end of any of odd-numbered wraps, the controller 16 may write the general DSS to the current wrap on the tape medium 23 (step 105). Specifically, the controller 16 may control the motor driver 18 to drive the motor 15, the head position control system 17 to adjust the position of the head 14 to the current wrap, and the channel 13 to supply the general DSS to the head 14. Note that, also in the case where the determination result of step 102 is "NO", step 105 may be performed.

After the DSS (including the general DSS) has been written to the tape medium 23 at step 103 or step 105, the controller 16 may write the data set to the tape medium 23 (step 106). Specifically, the controller 16 may control the motor driver 18 to drive the motor 15, the head position control system 17 to adjust the position of the head 14 to the current wrap, and the channel 13 to pass the data set from the buffer 12 to the head 14.

After that, the controller 16 may determine whether or not any other data set to be written exists (step 107). If other data set to be written exists, the controller 16 may return to step 101. If, at step 107, no other data set to be written exists, the controller 16 may proceed to the end.

Figure 5:
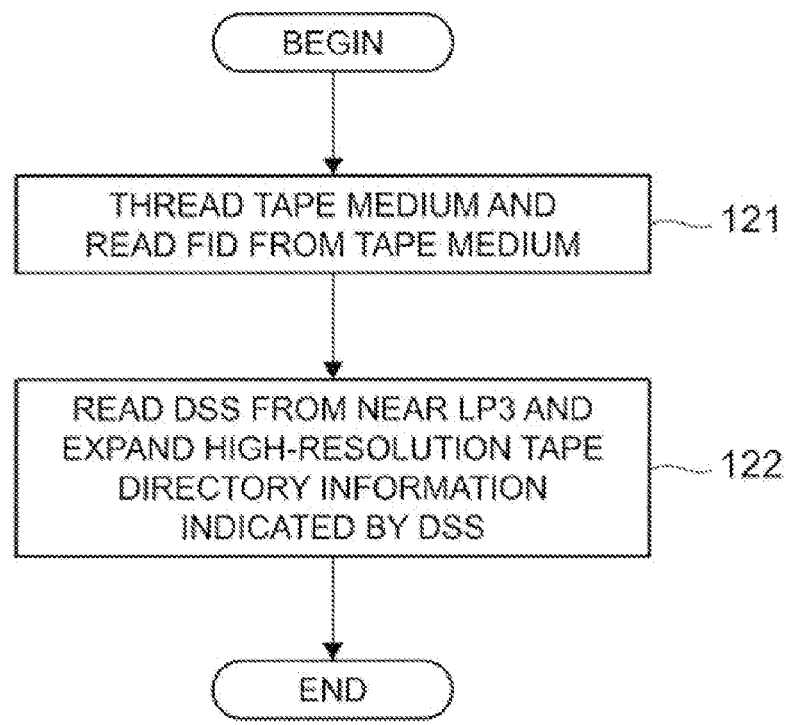
FIG. 5 depicts a flowchart representing an operation performed when a tape drive reads a DSS in which high-resolution tape directory information is embedded.

Referring to FIG. 5, there is shown a flowchart representing an example of an operation performed when the tape drive 10 reads the DSS in which the high-resolution tape directory information is embedded. When receiving a mount request of the tape medium 23 from the host 30 via the host interface 11, the controller 16 begins the operation.

As shown in the figure, the controller 16 may first thread the tape medium 23 and read the FID from the tape medium 23 (step 121). Specifically, the controller 16 may control the motor driver 18 to drive the motor 15, the head position control system 17 to adjust the position of the head 14 to the wrap on which the FID has been recorded, and the channel 13 to take in the FID from the head 14.

Subsequently, the controller 16 may read the DSS from near the LP3 and expand high-resolution tape directory information indicated by the DSS (step 122). Specifically, the controller 16 may specify the LP3 on the tape medium 23, on the basis of the FID read at step 121. Next, the controller 16 may control the motor driver 18 to drive the motor 15, the head position control system 17 to adjust the position of the head 14 to each wrap, and the channel 13 to take in the DSS near the LP3 on each wrap from the head 14. Finally, the controller 16 may generate the high-resolution tape directory information on the basis of the DSS for all wraps, and may expand the high-resolution tape directory information to the RAM 42.

After that, in response to a read request of a record from the host 30, the tape drive 10 may specify a wrap on which the record has been written, with reference to the tape directory information stored in the cartridge memory 24. Next, the tape drive 10 may specify a position on the wrap where the record has been written, with reference to the high-resolution tape directory information of a wrap next to the wrap on which the record has been written. Note that the high-resolution tape directory information has been expanded to the RAM 42. By thus specifying the position on the wrap, the tape drive 10 reads the record from the position on the wrap.

In the foregoing description, the high-resolution tape directory information is assumed to be embedded in the DSS. However, as an alternative embodiment, write condition information is assumed to be embedded in the DSS, as one example of specific information regarding the sequential storage medium. The write condition information indicates write conditions under which each data set has been written on the tape medium 23. For example, the write condition information may include information indicating the tape drive which has written each data set. Alternatively, the write condition information may include information in writing each data set, which indicates a moving speed of the tape medium 23, a write position on the tape medium 23, an error occurrence, settings for the channel 13, setting of servo parameters, and the like. Such information may be used to help the tape drive 10 to read each data set. Furthermore, a piece of an index (i.e., metadata) of the Linear Tape File System (LTFS) may be embedded in the DSS.

Figure 6:
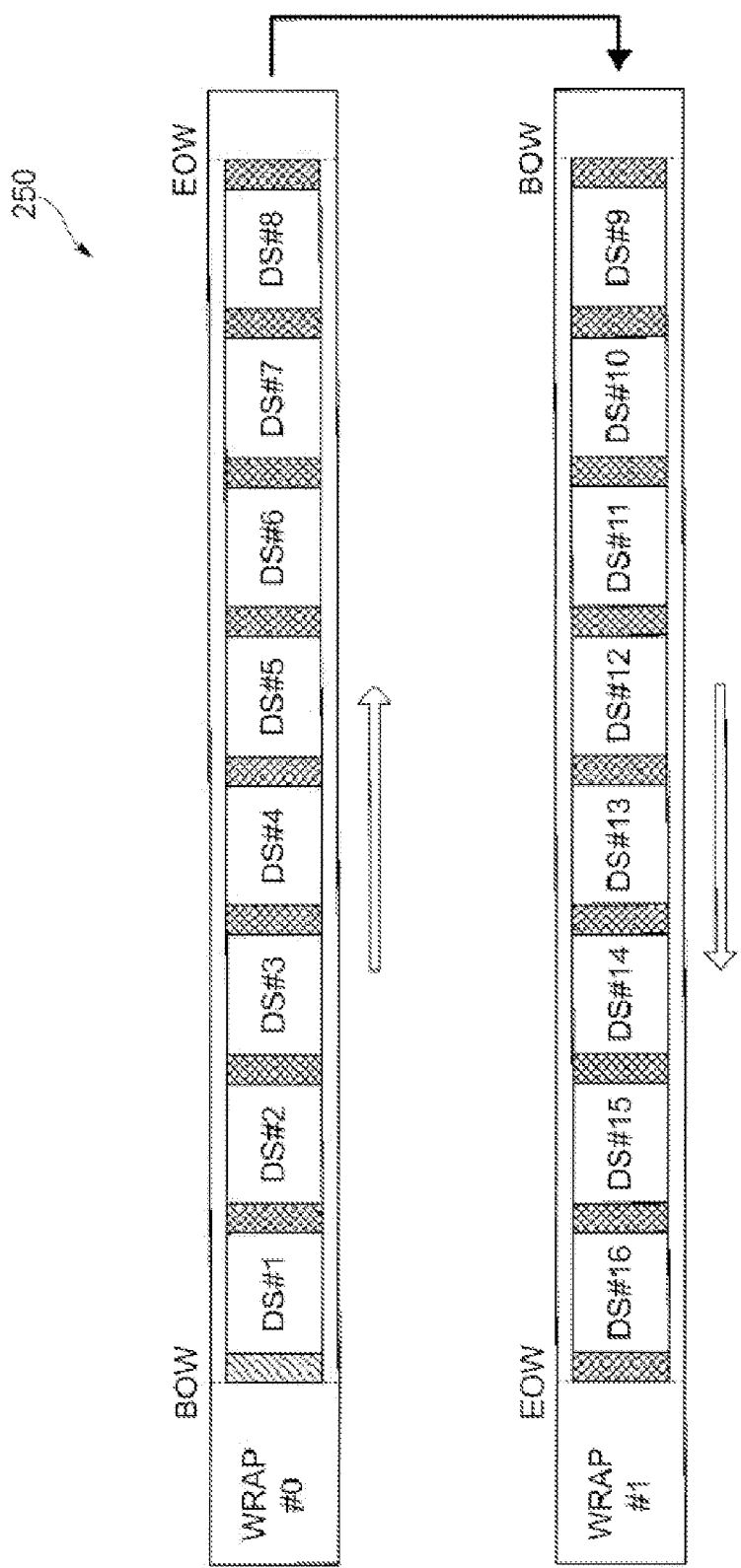
FIG. 6 depicts an example of a tape medium on which write condition information is embedded in a DSS.

Referring to FIG. 6, there is shown a diagram illustrating an example of a tape medium 250 on which the write condition information is embedded in the DSS immediately posterior to each data set. In FIG. 6, each unshaded arrow indicates a direction in which data sets are written on the tape medium 250, while a black arrow indicates that a moving direction of the tape medium 250 is reversed in accordance with a wrap turn.

First, data sets DS#1 to DS#8 are written on a wrap #0 in a forward direction, as indicated by unshaded squares. While the data sets are written, DSSs are written anterior to DS#1, between DS#N and DS#N+1 where N is 1 to 7, and posterior to DS#8, on the wrap #0. In FIG. 6, each DSS immediately posterior to each data set on the wrap #0 indicates write condition information, as indicated by double hatching. The data set DS#N is one example of a first data block out of the plural data blocks, the data set DS#N+1 is one example of a second data block next to the first data block out of the plural data blocks, and the area immediately posterior to DS#N is one example of an area to be accessed after accessing the first data block and before accessing the second data block, in reading the plural data blocks sequentially from the sequential storage medium, where N is 1 to 8.

Next, data sets DS#9 to DS#16 are written on a wrap #1 in a reverse direction, as indicated by unshaded squares. While the data sets are written, DSSs are written anterior to DS#9, between DS#N and DS#N+1 where N is 9 to 15, and posterior to DS#16, on the wrap #1. In FIG. 6, each DSS immediately posterior to each data set on the wrap #1 indicates write condition information, as indicated by double hatching. The data set DS#N is one example of a first data block out of plural data blocks, the data set DS#N+1 is one example of a second data block next to the first data block out of the plural data blocks, and the area immediately posterior to DS#N is one example of an area to be accessed after accessing the first data block and before accessing the second data block, in reading the plural data blocks sequentially from the sequential storage medium, where N is 9 to 16.

Figure 7:
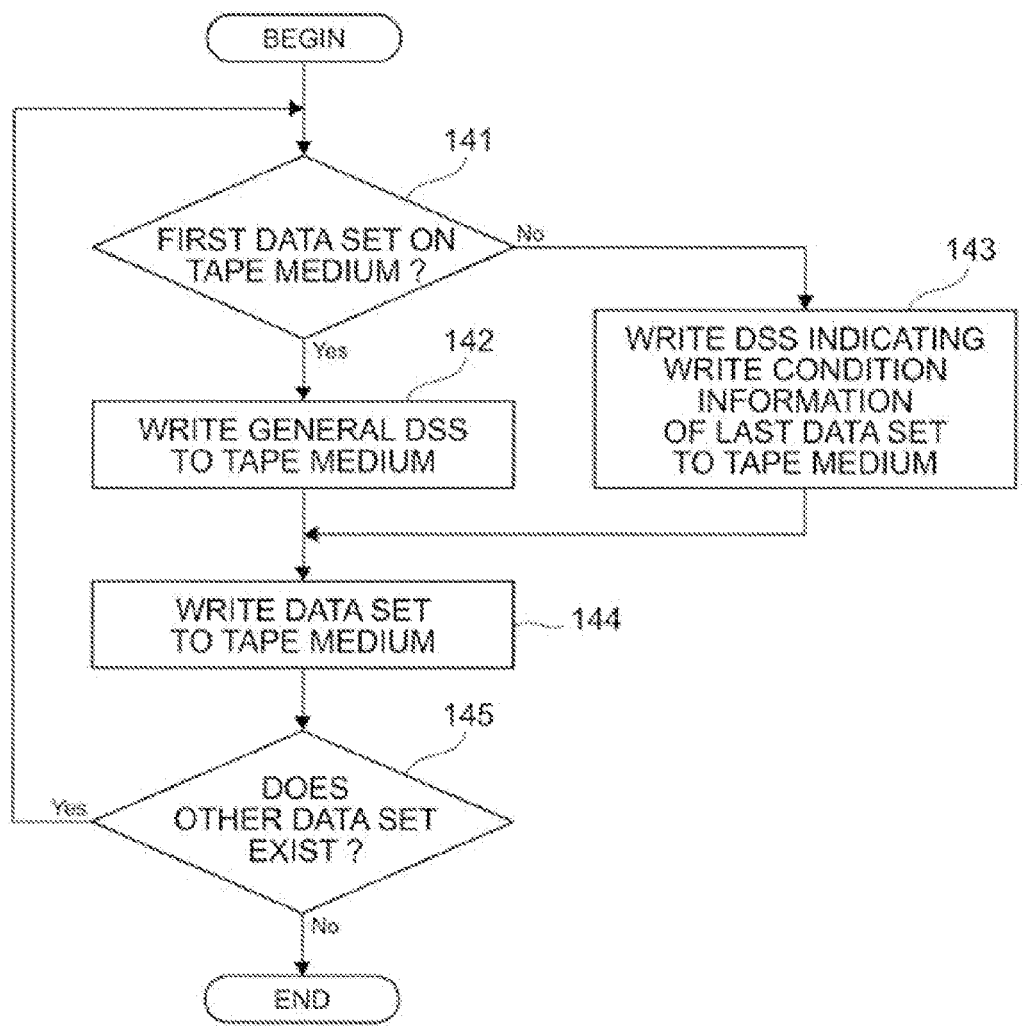
FIG. 7 depicts a flowchart representing an operation performed when a tape drive writes a DSS in which write condition information is embedded.

Referring to FIG. 7, there is shown a flowchart representing an example of an operation performed when the tape drive 10 writes the DSS in which the write condition information is embedded. The host interface 11 receives records from the host 30, and stores the records in the buffer 12. After that, when receiving a write request of a data set from the host 30 via the host interface 11, the controller 16 begins the operation. Note that the controller 16 converts the records into the data set, for example, using the RLL encoding, in advance of writing the data set.

As shown in the figure, the controller 16 may determine whether or not the data set to be written is the first data set on the tape medium 23 (step 141). If the data set is the first data set on the tape medium 23, the controller 16 may write the general DSS to the tape medium 23 (step 142). Specifically, the controller 16 may control the motor driver 18 to drive the motor 15, the head position control system 17 to adjust the position of the head 14 to the current wrap, and the channel 13 to supply the general DSS to the head 14.

If, at step 141, the data set to be written is not the first data set on the tape medium 23, the controller 16 may write a DSS indicating the write condition information of the last data set to the tape medium 23 (step 143). Specifically, the controller 16 may first determine plural bit patterns to be embedded in the DSS on the basis of the write condition information. Next, the controller 16 may control the motor driver 18 to drive the motor 15, the head position control system 17 to adjust the position of the head 14 to the current wrap, and the channel 13 to supply the DSS to the head 14.

After the DSS (including the general DSS) has been written to the tape medium 23 at step 142 or step 143, the controller 16 may write the data set to the tape medium 23 (step 144). Specifically, the controller 16 may control the motor driver 18 to drive the motor 15, the head position control system 17 to adjust the position of the head 14 to the current wrap, and the channel 13 to pass the data set from the buffer 12 to the head 14.

After that, the controller 16 may determine whether or not any other data set to be written exists (step 145). If other data set to be written exists, the controller 16 may return to step 141. If, at step 145, no other data set to be written exists, the controller 16 may proceed to the end.

Figure 8:
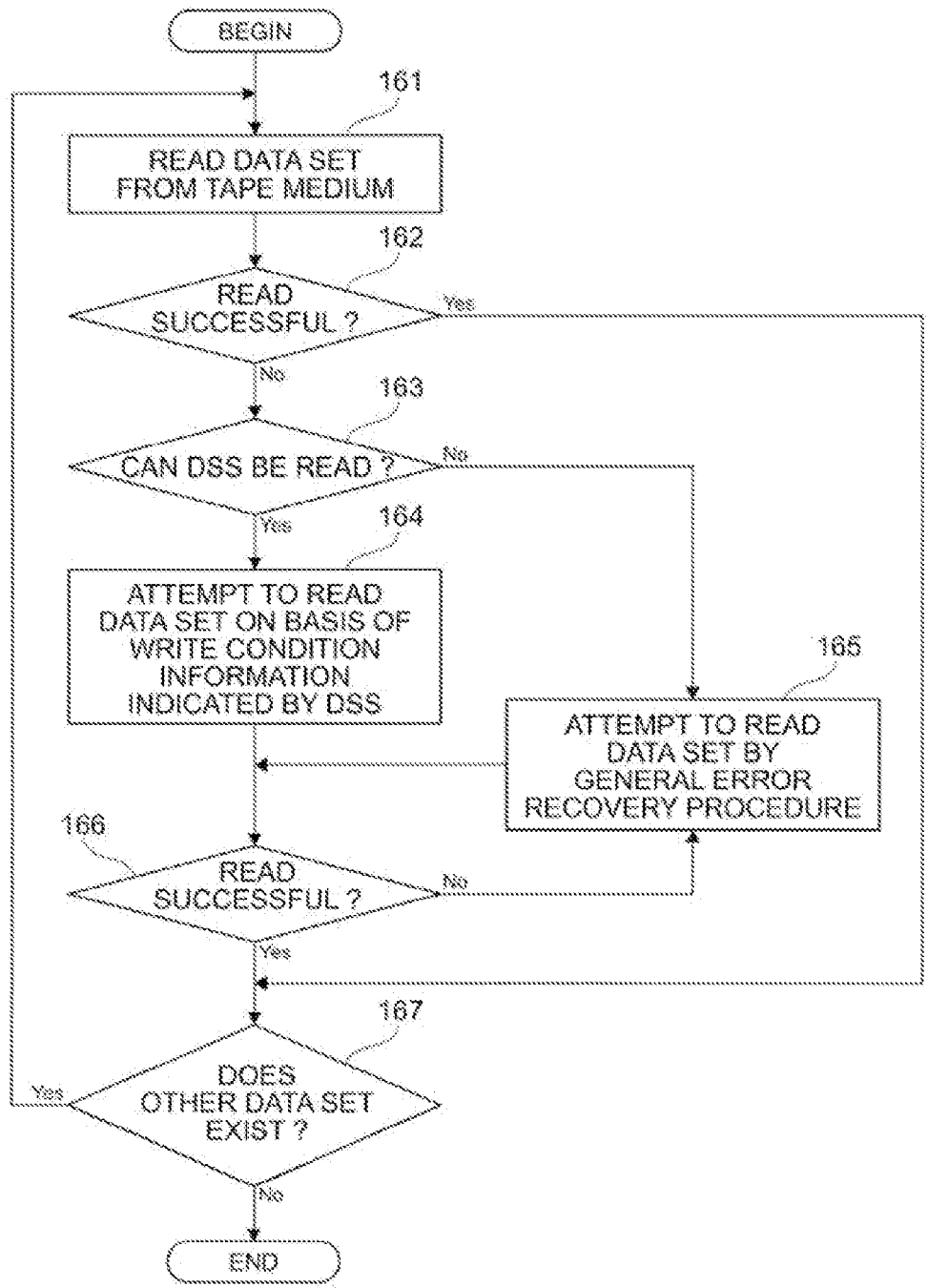
FIG. 8 depicts a flowchart representing an operation performed when a tape drive reads a DSS in which write condition information is embedded.

Referring to FIG. 8, there is shown a flowchart representing an example of an operation performed when the tape drive 10 reads the DSS in which the write condition information is embedded. When receiving a read request of a data set from the host 30 via the host interface 11, the controller 16 begins the operation.

As shown in the figure, the controller 16 may first read the data set from the tape medium 23 (step 161). Specifically, the controller 16 may control the motor driver 18 to drive the motor 15, the head position control system 17 to adjust the position of the head 14 to the wrap on which the data set has been recorded, and the channel 13 to pass the data set from the head 14 to the buffer 12.

Next, the controller 16 determines whether or not the reading is successful (step 162). If the reading is unsuccessful, the controller 16 further determines whether or not the DSS immediately posterior to the data set can be read (step 163).

If the DSS can be read, the controller 16 attempts to read the data set on basis of the write condition information indicated by the DSS (step 164). Specifically, the controller 16 may first abstract the write condition information from the DSS, and may set the write condition indicated by the write condition information to the channel 13, the motor 15, or the like. Next, the controller 16 may control the motor driver 18 to drive the motor 15, the head position control system 17 to adjust the position of the head 14 to the wrap on which the data set has been recorded, and the channel 13 to pass the data set from the head 14 to the buffer 12.

If, at step 163, the DSS cannot be read, the controller 16 may attempt to read the data set by general error recovery procedure (step 165). Specifically, the controller 16 may control the motor driver 18 to drive the motor 15, the head position control system 17 to adjust the position of the head 14 to the wrap on which the data set has been recorded, and the channel 13 to pass the data set from the head 14 to the buffer 12.

After the attempt to read the data set at step 164 or step 165, the controller 16 may again determine whether or not the reading is successful (step 166). If the reading is unsuccessful, the controller 16 may return to step 165.

If, at step 162 or step 166, the reading is successful, the controller 16 may determine whether or not any other data set to be read exists (step 167). If other data set to be read exists, the controller 16 may return to step 161. If, at step 167, no other data set to be read exists, the controller 16 may proceed to the end.

The exemplary embodiments only increase variation of bit patterns included in the DSS, which is written due to its necessity, and adds no extra data. This causes no influence on storage density of data on the tape medium. For this reason, the influence of reading and writing of the DSS on a data transfer rate is the same as the case where the general DSS is used. That is, application of the exemplary embodiments causes no adverse effect on the tape drive which has been generally used.

To simplify the explanation, an example has been described above where the DSS composed of two bit patterns is used. However, by combining three or more bit patterns, the amount of information to be embedded in the DSS of a fixed length may be improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for writing data to a sequential storage medium, the method comprising:
    writing a plurality of data blocks sequentially to the sequential storage medium; and
    writing a data pattern to an area on the sequential storage medium, the area being an area to which none of the plurality of data blocks is written, the data pattern including a plurality of bit patterns appearing in none of the plurality of data blocks, and none of the plurality of data blocks are written to the area and the data pattern represents specific information regarding the sequential storage medium, wherein the specific information includes write condition information indicating a write condition in writing a first data block out of the plurality of data blocks to the sequential storage medium, and wherein the area is an area to be accessed after accessing the first data block and before accessing a second data block next to the first data block out of the plurality of data blocks, in reading the plurality of data blocks sequentially from the sequential storage medium.

2. The method of claim 1, wherein the specific information comprises tape directory information indicating correspondence between physical positions on the sequential storage medium and logical data units written to the physical positions, any one of the plurality of data blocks comprises one of the logical data units.

3. The method of claim 1, wherein the area is an area accessible prior to accessing any of the plurality of data blocks, after the sequential storage medium has been threaded.

4. The method of claim 1, further comprising:
attempting to read the first data block from the sequential storage medium; and
attempting to read the first data block again, in response to an unsuccessful attempt to read the first data block, based on the write condition information.

5. A computer program product for writing data to a sequential storage medium, the computer program product comprising:
one or more non-transitory computer-readable storage media and program instructions stored on the one or more computer-readable storage media, the program instructions comprising:
program instructions to write a plurality of data blocks sequentially to the sequential storage medium; and
program instructions to write a data pattern to an area on the sequential storage medium, the area being an area to which none of the plurality of data blocks is written, the data pattern including a plurality of bit patterns appearing in none of the plurality of data blocks, and none of the plurality of data blocks are written to the area and the data pattern represents specific information regarding the sequential storage medium, wherein the specific information includes write condition information indicating a write condition in writing a first data block out of the plurality of data blocks to the sequential storage medium, and wherein the area is an area to be accessed after accessing the first data block and before accessing a second data block next to the first data block out of the plurality of data blocks, in reading the plurality of data blocks sequentially from the sequential storage medium.

6. The computer program product of claim 5, wherein the specific information comprises tape directory information indicating correspondence between physical positions on the sequential storage medium and logical data units written to the physical positions, any one of the plurality of data blocks comprises one of the logical data units.

7. The computer program product of claim 5, wherein the area is an area accessible prior to accessing any of the plurality of data blocks, after the sequential storage medium has been threaded.

8. The computer program product of claim 5, further comprising:
program instructions to attempt to read the first data block from the sequential storage medium; and
program instructions to attempt to read the first data block again, in response to an unsuccessful attempt to read the first data block, based on the write condition information.

9. A computer system for writing data to a sequential storage medium, the computer system comprising:
one or more computer processors, one or more computer-readable storage media, and program instructions stored on the one or more of the computer-readable storage media for execution by at least one of the one or more processors, the program instructions comprising:
program instructions to write a plurality of data blocks sequentially to the sequential storage medium; and
program instructions to write a data pattern to an area on the sequential storage medium, the area being an area to which none of the plurality of data blocks is written, the data pattern including a plurality of bit patterns appearing in none of the plurality of data blocks, and none of the plurality of data blocks are written to the area and the data pattern represents specific information regarding the sequential storage medium, wherein the specific information includes write condition information indicating a write condition in writing a first data block out of the plurality of data blocks to the sequential storage medium, and wherein the area is an area to be accessed after accessing the first data block and before accessing a second data block next to the first data block out of the plurality of data blocks, in reading the plurality of data blocks sequentially from the sequential storage medium.

10. The computer system of claim 9, wherein the specific information comprises tape directory information indicating correspondence between physical positions on the sequential storage medium and logical data units written to the physical positions, any one of the plurality of data blocks comprises one of the logical data units.

11. The computer system product of claim 9, wherein the area is an area accessible prior to accessing any of the plurality of data blocks, after the sequential storage medium has been threaded.

12. The computer system product of claim 9, further comprising:
program instructions to attempt to read the first data block from the sequential storage medium; and
program instructions to attempt to read the first data block again, in response to an unsuccessful attempt to read the first data block, based on the write condition information.

* * * * *